Reissued July 28, 1942

Re. 22,145

UNITED STATES PATENT OFFICE 22,145

TREATMENT OF FABRICS

Cornelius A. Alt, Newburgh, N. Y., assignor to E. I. du Pont de Nemours & Company, Wilmington, Del., a corporation of Delaware No Drawing. Original No. 2,127,320, dated August 16, 1938, Serial No. 55,198, December 19, 1935. Application for reissue May 6, 1942, Serial No. 441,920

4 Claims. (Cl. 117—86)

This invention relates to a method for treating fabrics and more particularly to a method for treating fabrics which are to be coated with cellulose derivative coating compositions and which are subjected to sunlight exposure in service.

Cellulose derivative coated fabrics of various types are extensively used for many purposes but possess certain limitations for specialized uses such as window shade materials or other materials which are continuously exposed to sunlight. Cellulose derivative coated fabrics which are subjected to prolonged exposure to actinic rays are subject to deterioration of the coating composition and of the base fabric. In United States of America Letters Patent 2,033,170, issued March 10, 1936, is disclosed a means of overcoming or reducing to a minimum the deterioration of the material when placed in service by the use of leaded zinc oxide in the coating composition.

The shade cloth therein described represents a great improvement over the prior art. One phase of the present invention represents a method of producing a shade cloth having exceptionally long life in a different manner.

I have found that such further improvements may be made in cellulose derivative coated fabrics particularly those used for shade cloth which are subjected to prolonged exposure to actinic rays and such improvements are embodied in the present invention.

This invention has as an object the provision of a process for producing improved cellulose derivative coated fabrics which are characterized by improved resistance to aging upon exposure to sunlight.

A further object is the provision of a process for producing improved cellulose derivative fabrics useful for shade cloth which exhibits improved resistance to tendering upon prolonged exposure to sunlight.

These and other objects which will appear hereinafter are accomplished by impregnating a fabric with a material which may be described as an acid acceptor preliminary to the application of the coating composition.

In cellulose derivative coated fabrics, particularly those using cellulose nitrate, the bond or anchorage of the coating composition with a base fabric is favored by the projecting loose ends of the fibers of the yarns being embedded in the film of the coating composition. These fibers would be readily weakened or destroyed by the liberation of certain deleterious agents originating from a decomposition of the cellulose nitrate. Such a weakening or destruction of the loose end fibers weakens or destroys the bond or anchorage of the film to the base fabric. In time the weakening of the fibers extends further and eventually weakens the yarns resulting in a general tendering of the entire fabric. The present invention which overcomes the tendency of the weakening or destruction of the loose end fibers and such yarns of the fabric is best illustrated by the following description of the process for treating the fabric.

The sheet material which is later to be coated is impregnated by passing it through a thin aqueous slurry of an acid acceptor such as zinc oxide and is then passed through or between suitable rolls to remove the excess of the slurry and finally is dried by contacting it with heated air. A dye padding machine has been found useful for the impregnating step especially so since such a machine has attached to it suitable rolls for pressing out the excess material.

The zinc oxide preferred for use is that known in the trade as "Kadox" and produced according to the process disclosed in U. S. Patent 1,522,096. The particles of this particular zinc oxide are described as being colloidal in nature and measurements reveal them to have an average size of the order of .12 micron, and practically all the particles are between .10 and .20 micron in size.

The impregnating medium is prepared by grinding 1 part of the "Kadox" described above with 2 parts of water in a suitable ball mill for a period of approximately 2 hours. A viscous paste is thus produced. This paste is then added to a sufficient quantity of water to produce a concentration of approximately 5% of dry zinc oxide.

By using a slurry with a zinc oxide concentration of approximately 5% and further using normal padder conditions the fabric will gain about 70% in water and zinc oxide. Since the usual limits are from 50% to 100% of the fabric by the impregnating media, 100 lbs. of cloth will be impregnated with about 3.5 lbs. dry zinc oxide. The amount of water and zinc oxide which is taken up by the fabric can be varied and controlled within limits by a control of the pressure applied on the squeeze rolls.

After the fabric has been impregnated and dried as noted above it is coated with a cellulose derivative coating composition by means of a doctor knife or any other suitable means well known to those skilled in the art of coating fabrics. A suitable coating composition to be applied to fabric is:

| | Parts by weight |
|---|---|
| Cellulose nitrate | 15.0 |
| Pigment | 22.6 |
| Plasticizer | 11.3 |
| Ethyl acetate | 20.4 |
| Ethyl alcohol | 30.7 |

Any commercial zinc oxide, pure or leaded, may may be used in the slurry with which the fabric is impregnated but the "Kadox" material with a lead content varying between limits of 0.5–1.0% expressed as lead oxide is preferred. Although best results accrue with the use of colloidal zinc oxide, other materials such as zinc hydroxide, 5% leaded zinc oxide, calcium hydroxide, aluminum hydroxide, zinc acetate, ammonium borate, etc., yield satisfactory results when used in combination with zinc oxide.

The concentration of the zinc oxide for example in the impregnating slurry may vary from very small concentrations such as 1% to a concentration of as high as 20%. However a concentration of approximately 5% is preferred as it yields most satisfactory results from a practical standpoint. Concentrations lower than 1% as well as concentrations above 10% are not preferred because the former requires several impregnating treatments and the latter deposits too great an amount of zinc oxide in the fabric causing dusting after the material has dried.

If desired the impregnation operation may be carried out in connection with the bleaching operation of the fabric. Under such conditions it is not necessary to dry the fabric before impregnating, although a slightly higher percentage of zinc oxide in the impregnating medium is necessary. Modifications in connection therewith are such as will be readily apparent to those skilled in the art and are well within the purview of the present invention.

The treatment described herein is not limited to any particular type of fabric but to all such types of fabrics as are usually coated as, for example, sheetings, ducks, canvas, drills, sateens, moleskin, broken twills, etc.

The principal advantage of the invention is the production of coated fabrics which are superior to material made according to the present state of the art with respect to the life of the coated fabric as determined by tendering in service. It has been found that the tendering of cellulose nitrate coated fabrics particularly such as are used for shade cloth can be retarded to such an extent that the life of the material as determined by accelerated tests may be prolonged from 12 to 20 weeks. This represents a life increase of at least 60% by treatment of the fabric as described in the present invention which when transposed into years of normal service is remarkable. A further advantage is the improved anchorage or bond of the coating to the fabric which greatly increases the life of such bond or anchorage when the material is placed in service.

It is apparent that many widely different embodiments of this invention may be made without departing from the spirit and scope thereof; and, therefore, it is not intended to be limited except as indicated in the appended claims.

I claim:

1. The process of preparing shade cloth which comprises the improvement of applying directly to an uncoated cloth a composition containing an acid acceptor consisting substantially of colloidal zinc oxide, removing all of the ingredients of the said composition except the acid acceptor, and thereafter applying a cellulose derivative coating.

2. Process of preparing shade cloth which comprises impregnating an unfilled fabric base with a 5% slurry of zinc oxide, the particle size of which is between .10 and .20 micron in diameter, removing the excess slurry by passing the impregnated fabric through squeeze rolls, drying the treated fabric, and applying to at least one surface of the fabric a composition comprising cellulose nitrate pigment and plasticizer.

3. Process of preparing shade cloth which comprises impregnating an unfilled fabric base with a 5% slurry of colloidal zinc oxide, drying the fabric, and applying thereto a composition having the following formula:

| | Parts by weight |
|---|---|
| Cellulose nitrate | 15 |
| Pigment | 22.6 |
| Plasticizer | 11.3 |
| Ethyl acetate | 20.4 |
| Ethyl alcohol | 30.7 |

4. Shade cloth having a fabric base containing zinc oxide and a cellulose nitrate composition coating, obtainable by impregnating an unfilled fabric base with a 5% slurry of colloidal zinc oxide, drying the fabric, and applying thereto a composition having the following formula:

| | Parts by weight |
|---|---|
| Cellulose nitrate | 15 |
| Pigment | 22.6 |
| Plasticizer | 11.3 |
| Ethyl acetate | 20.4 |
| Ethyl alcohol | 30.7 |

CORNELIUS A. ALT.